United States Patent
Shirakawa et al.

(10) Patent No.: US 11,506,115 B2
(45) Date of Patent: Nov. 22, 2022

(54) COGENERATION SYSTEM

(71) Applicant: Hitachi, Ltd., Tokyo (JP)

(72) Inventors: Yuzo Shirakawa, Tokyo (JP); Hiroto Naito, Tokyo (JP); Takao Ishikawa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 305 days.

(21) Appl. No.: 16/778,555

(22) Filed: Jan. 31, 2020

(65) Prior Publication Data

US 2020/0248617 A1    Aug. 6, 2020

(30) Foreign Application Priority Data

Feb. 4, 2019   (JP) .............................. JP2019-017633

(51) Int. Cl.
*F02B 43/12*       (2006.01)
*F02M 31/20*     (2006.01)

(52) U.S. Cl.
CPC ........... *F02B 43/12* (2013.01); *F02M 31/205* (2013.01)

(58) Field of Classification Search
CPC ...... F02B 43/12; F02B 43/10; F02D 19/0671; F02D 29/06; F02M 31/205; F02G 5/02
USPC .......................................................... 123/3
See application file for complete search history.

(56) References Cited

U.S. PATENT DOCUMENTS

| | | | |
|---|---|---|---|
| 6,318,306 B1* | 11/2001 | Komatsu | ................ F02M 31/08 123/3 |
| 2004/0068987 A1* | 4/2004 | Matsuoka | .......... F02M 21/0206 60/649 |
| 2008/0155984 A1 | 7/2008 | Liu et al. | |

(Continued)

FOREIGN PATENT DOCUMENTS

| JP | 6-200709 A | 7/1994 |
|---|---|---|
| JP | 10-292902 A | 11/1998 |
| JP | 2002-195051 A | 7/2002 |

(Continued)

OTHER PUBLICATIONS

Japanese-language Office Action issued in Japanese Application No. 2019-017633 dated Oct. 26, 2021 with English translation (six (6) pages).

*Primary Examiner* — Lindsay M Low
*Assistant Examiner* — Omar Morales
(74) *Attorney, Agent, or Firm* — Crowell & Moring LLP

(57) ABSTRACT

The invention provides a cogeneration system capable of adjusting a heat-to-electric power ratio not only in an increasing direction, but also in a decreasing direction. The cogeneration system includes: a power generation device configured to supply electric power; a first heat exchanger configured to exchange heat between exhaust of the power generation device and water, so as to lower a temperature of the exhaust and obtain steam from the water; a reformer configured to generate a reformed gas by the steam reacting with a fuel; a second heat exchanger configured to cool the reformed gas generated by the reformer by heat exchanging;

(Continued)

a reformed gas supply device configured to supply the reformed gas cooled by the second heat exchanger to the power generation device; a distributor configured to supply the steam to at least one of the reformer and a heat utilization device; and a control device configure to adjust a heat-to-electric power ratio by changing a supply destination of the steam in the distributor.

10 Claims, 8 Drawing Sheets

(56) References Cited

U.S. PATENT DOCUMENTS

2014/0109844 A1* 4/2014 Wall .................. F02M 21/0287
123/3

FOREIGN PATENT DOCUMENTS

| | | |
|---|---|---|
| JP | 2002-227730 A | 8/2002 |
| JP | 2008-163944 A | 7/2008 |
| JP | 2012-107557 A | 6/2012 |
| JP | 2014-125923 A | 7/2014 |
| JP | 2015-78640 A | 4/2015 |
| JP | 2015-96703 A | 5/2015 |

* cited by examiner

COGENERATION SYSTEM

CLAIM OF PRIORITY

The present application claims priority from Japanese Patent application serial No. 2019-017633, filed on Feb. 4, 2019, the content of which is hereby incorporated by reference into this application.

BACKGROUND OF THE INVENTION

1. Field of the Invention

The present invention relates to a cogeneration system.

2. Description of the Related Art

Based on viewpoints of efficient use of energy, diversification and decentralization of power configuration, disaster countermeasures, and the like, there is a trend that a spread of cogeneration systems that can supply both heat and electric power is expanding.

The cogeneration system is a system that includes a power generation device and a heat collecting device, and supplies both electric power and heat. The electric power is supplied by a power generation device such as a gas turbine, a spark ignition engine, a diesel engine, or a fuel cell as a power source. Meanwhile, the heat is supplied by producing steam or heated water by the heat collecting device such as a boiler or a heat exchanger attached to an exhaust pipe or the like of the power source, and supplying the steam or the heated water to a heat utilization device.

As described above, since both the electric power and the heat can be used, energy with high efficiency in which total efficiency reaches about 80% can be utilized.

In the cogeneration system, a ratio of an output of the heat and the electric power (hereinafter referred to as "heat-to-electric power ratio") that can be supplied is determined by specifications of devices, and the cogeneration system is often operated at a constant ratio. Therefore, when there is a change in the heat-to-electric power ratio of a consumer, it is a problem that the total efficiency of the cogeneration system is significantly reduced.

In addition, many of current cogeneration systems have a relatively large heat-to-electric power ratio, and are not introduced to facilities with a small heat-to-electric power ratio. Therefore, a technique that can change the heat-to-electric power ratio is required. Furthermore, under the condition that the heat-to-electric power ratio is reduced, improvement in the total efficiency is required by improving power generation efficiency.

JP-A-2014-125923 (Patent Literature 1) discloses an engine combined system including: a modifier that generates modified fuel containing hydrogen by steam modification by using engine waste heat; an engine driven with the modified fuel as fuel; a dynamo generating power by using power of the engine; and a heat utilization system generating cooling-heating or power by using engine waste heat that is not utilized by the modifier, in which the engine combined system heats water supplied to the modifier by using waste heat in the heat utilization system, and the heat utilization system is a rankine cycle or an absorption refrigerator.

Many of the techniques related to adjustment of the heat-to-electric power ratio in the cogeneration system of the related art increase heat quantity, that is, increase the heat-to-electric power ratio, but it is difficult to reduce the heat-to-electric power ratio. Therefore, the facility with a small heat-to-electric power ratio has a problem that it cannot use much of the heat supplied by the cogeneration system. For this reason, there is a situation that even when the cogeneration system is introduced, the effect cannot be sufficiently obtained.

In addition, since the heat-to-electric power ratio varies depending on seasons and time, a demand of energy of each facility is generally required to operate under the condition that the heat-to-electric power ratio is small.

For these reasons, in the cogeneration system, a technology capable of adjusting a heat-to-electric power ratio in a decreasing direction is required.

An object of the engine combined system disclosed in Patent Literature 1 is to increase system efficiency by effectively utilizing the engine waste heat. In this regard, as can be seen from examples of the heat utilization systems such as the Rankine cycle or the absorption refrigerator, when designing the system that adjusts the heat-to-electric power ratio in an increasing direction or a decreasing direction, it is important that either one direction is selected and attached to the heat utilization system. That is, the increasing or decreasing direction of the heat-to-electric power ratio is determined at a design stage. Therefore, there is room for improvement from a viewpoint of freely adjusting the heat-to-electric power ratio during operation of the system.

SUMMARY OF THE INVENTION

An object of the invention is to provide a cogeneration system capable of adjusting a heat-to-electric power ratio not only in an increasing direction, but also in a decreasing direction.

A cogeneration system includes: a power generation device configured to supply electric power; a first heat exchanger configured to exchange heat between exhaust of the power generation device and water, so as to lower a temperature of the exhaust and obtain steam from the water; a reformer configured to generate a reformed gas by the steam reacting with a fuel; a second heat exchanger configured to cool the reformed gas generated by the reformer by heat exchanging; a reformed gas supply device configured to supply the reformed gas cooled by the second heat exchanger to the power generation device; a distributor configured to supply the steam to at least one of the reformer and a heat utilization device; and a control device configure to adjust a heat-to-electric power ratio by changing a supply destination of the steam in the distributor.

According to the invention, the cogeneration system capable of adjusting the heat-to-electric power ratio not only in an increasing, but also in a decreasing direction can be provided.

DESCRIPTION OF THE PREFERRED EMBODIMENTS

The invention relates to a technology capable of changing a heat-to-electric power ratio in an increasing direction or a decreasing direction in a cogeneration system that supplies heat and electric power simultaneously. That is, the invention relates to a heat-to-electric power ratio variable cogeneration system.

First Embodiment

Firstly, a configuration of a cogeneration system according to the first embodiment of the invention and an operation method thereof will be described. In each of following drawings, solid arrows represent conduits through which fuel, a reformed gas, water, or steam can flow, and flow directions thereof. Dashed arrows represent signal lines for measurement and control transmission.

Fuel Separation and Reformation Engine System

Figure 1:
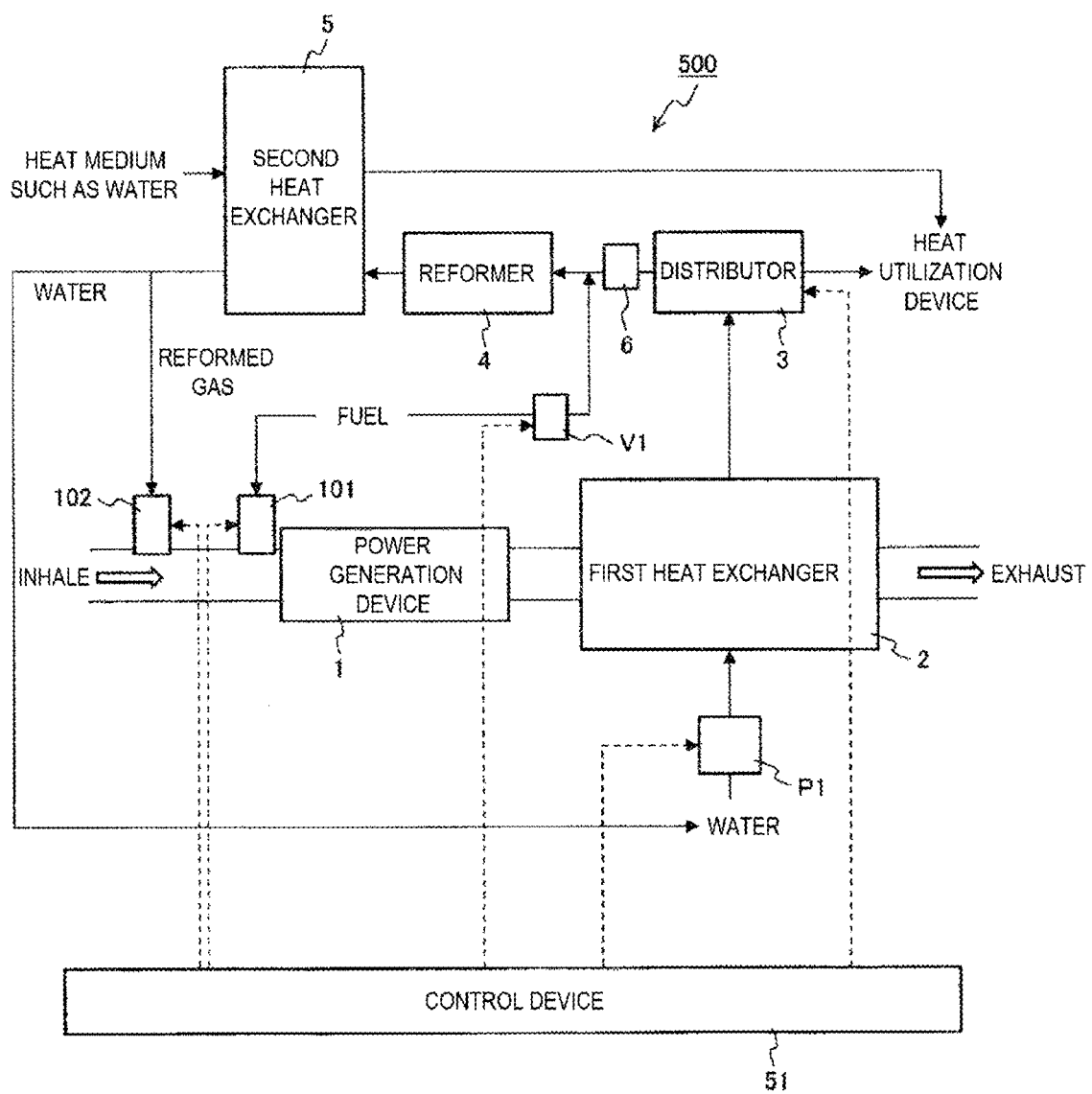
FIG. 1 is a schematic configuration diagram illustrating a cogeneration system according to a first embodiment.

FIG. 1 is a schematic configuration diagram illustrating the cogeneration system according to the first embodiment.

In FIG. 1, a cogeneration system 500 includes a power generation device 1, a first heat exchanger 2 that exchanges heat between exhaust and water, a distributor 3 that distributes high-temperature steam generated when the water is heated in the first heat exchanger 2, a reformer 4 (fuel reformer) that generates reformed gas by performing steam-reforming on fuel using the steam supplied from the distributor 3, a second heat exchanger 5 that exchanges heat between the reformed gas and a heat medium such as water, a fuel supply device 101 that supplies the fuel to the power generation device 1, and a reformed gas supply device 102 that supplies the reformed gas to the power generation device 1. A pressure reducer 6 (pressure reducing valve) is provided between the distributor 3 and the reformer 4.

The water is supplied to the first heat exchanger 2 through a water supply device P1. It is desirable that water stored in a water tank or the like is used as this water. In the first heat exchanger 2, heat is exchanged between the supplied water and the exhaust, and the water is heated until it becomes the high-temperature steam. The distributor 3 can supply the high-temperature steam to one or both of the reformer 4 and a heat utilization device. Here, the heat utilization device includes a room heating device for a living space such as a building.

When the steam is supplied from the distributor 3 to the reformer 4, the fuel is supplied from a fuel tank via a fuel flow control device V1 (fuel flow control valve). In the reformer 4, the reformed gas containing hydrogen is generated by performing the steam-reforming on the fuel. The reformed gas supplied from the reformer 4 exchanges heat between the water and the reformed gas by the second heat exchanger 5. The heat medium such as the water is heated and supplied to the heat utilization device. The reformed gas is cooled and separated into redundant water that does not react and the reformed gas. Thereafter, the reformed gas passes through the reformed gas supply device 102 and is used as fuel for the power generation device 1. The redundant water after the separation returns to the water tank or the like so as to be reused.

The fuel supply device 101, the reformed gas supply device 102, the fuel flow control device V1 and the water supply device P1 are controlled by signals from a control device 51.

A reaction formula of steam reforming when methane is used as the fuel is represented by the following formula (1).

$$CH_4 + 2H_2O = 4H_2 + CO_2 - 165 \text{ kJ} \qquad (1)$$

When steam reforming of the methane is performed, an endothermic reaction is represented by the above formula (1). Therefore, a lower calorific value of a reformed gas obtained after reforming the methane is 165 kJ higher than a lower calorific value of 1 mole of methane.

A part of the high-temperature steam is used as a heat source for this endothermic reaction. In the first heat exchanger 2, the high-temperature steam is produced by heating the water with heat of the exhaust of the power generation device 1. For this reason, a part of the heat of the exhaust of the power generation device 1 can be collected as a calorific value of the fuel of the power generation device 1.

As a result, a part of the heat of the exhaust of the power generation device 1 can be collected as a heat quantity of the fuel without being supplied to the heat utilization device, and an power generation output increases with respect to an unit of the heat quantity of the fuel supplied to the cogeneration system 500, thereby increasing power generation efficiency.

Therefore, an electric power ratio in the cogeneration system 500 can be increased by the distributor 3 controlling the high-temperature steam. That is, due to the control of the distributor 3, when all the steam are distributed to the heat utilization device, the maximum heat-to-electric power ratio is obtained, and when all the steam is distributed to the reformer 4, the minimal heat-to-electric power ratio is obtained in the cogeneration system 500.

According to this configuration, the heat-to-electric power ratio can be changed in the cogeneration system 500.

Power Generation Device

A known engine generator using a diesel engine, a spark ignition engine or the like is applied to the power generation device 1. In an engine of the engine generator, the fuel supply device 101 is provided in an intake pipe or a combustion chamber. Not only petroleum-based fuels such as gasoline and light oil, but also known fuels such as ethanol mixed gasoline, bioethanol and methane can be used as the fuel. Further, the reformed gas is supplied from the reformed gas supply device 102 to the intake pipe or the combustion chamber of the engine. Therefore, the engine generator is configured to generate power using for both or at least one of the fuel and the reformed gas.

There is no particular limitation on the number of the engine, and a plurality of engines may be used. All or a part of exhaust of the engine is supplied to the first heat exchanger 2 provided in an exhaust pipe. Therefore, the heat required for heating the water can be obtained.

There is no limitation on the number of the heat exchangers provided in the exhaust pipe, and when there is a plurality of the heat exchangers, the heat exchangers may be provided in parallel or serial connection. The heat of the exhaust of the engine is not only supplied to the first heat exchanger 2, but may be directly used for room heating or the like, or may be used for electric power conversion using a thermoelectric element or the like.

The hydrogen contained in the reformed gas has a high combustion speed and a wide combustion range as compared with a hydrocarbon fuel generally used as an engine fuel, so that rapid combustion and lean combustion are possible. Furthermore, since the hydrogen has higher combustibility than the hydrocarbon fuel, combustion efficiency can be improved. Therefore, heat efficiency of the engine is improved, and it becomes possible to reduce a fuel amount consumed for producing a same output.

Although not illustrated in the figure, the intake pipe of the engine is provided with an adjustment valve (usually a throttle) for an amount of air to be inhaled. As a result, control is performed so that air with an amount equal to or more than the stoichiometric air amount with respect to the amount of the fuel and the reformed gas is inhaled. Furthermore, when a percentage of the reformed gas containing the hydrogen is high, control is performed such that the amount of the air to be inhaled is increased to perform the lean combustion.

Water Supply Device

The water supply device P1 is provided in a flow path connecting the water tank or a water pipe with a water inlet flow path of the first heat exchanger 2. The water supply device P1 supplies a controlled predetermined amount of water to the first heat exchanger 2. A flow supplied to the first heat exchanger 2 may be controlled based on a temperature of the high-temperature steam at an outlet of the first heat exchanger 2. When the temperature of the steam at the outlet is equal to or higher than a predetermined temperature, an amount of water to be supplied to the heat exchanger is increased, and when the temperature is equal to or lower than the predetermined temperature, the amount of the water is decreased. By such flow control, the temperature of the steam at the outlet of the heat exchanger can be maintained at the predetermined temperature. Here, the predetermined temperature (set temperature) is determined by specifications of the power generation device, specifications of the heat utilization device, and the fuel. In particular, it is preferably determined by the heat utilization device and the fuel.

When the methane is used as the fuel, the temperature of the steam is preferably 400° C. or more. During the reforming of the fuel in the reformer 4, the reaction is promoted as the reaction temperature is higher, and therefore, the temperature of the steam to be supplied is preferably 500° C. or more.

When the high-temperature steam is not supplied from the distributor 3 to the reformer 4, a supply amount is controlled in accordance with a required temperature and a required pressure of the heat utilization device.

Heat Exchanger

A known heat exchanger can be used as the first heat exchanger 2 and the second heat exchanger 5. An appropriate heat exchanger is selected and used in accordance with a size and a specification of the power generation device 1. The configuration of the heat exchanger is not limited as long as it can generate steam by using the heat of the exhaust of the power generation device 1, such as a known heat exchanger including a general shell-and-tube type, a plate type, and a fin tube type, or an exhaust heat boiler. The number and structure of the heat exchanger are not limited, and when there is a plurality of heat exchangers, the arrangement thereof is also not limited, and they may be provided in parallel or serial connection.

The heat exchanger is preferably insulated from heat by attaching with a heat insulating material, for example, so as to reduce heat loss to atmosphere due to heat radiation. A pressure regulating valve which is not illustrated in the figure may be provided in the outlet of the heat exchanger. As a result, a pressure in the flow path of the heat exchanger can be increased and density can be increased, thereby increasing heat exchange capacity. Therefore, the heat exchanger can be miniaturized. In addition, if necessary, high-pressure steam of 0.78 MPa or more can be used as a heat source for the heat utilization device.

Distributor

Figure 2:
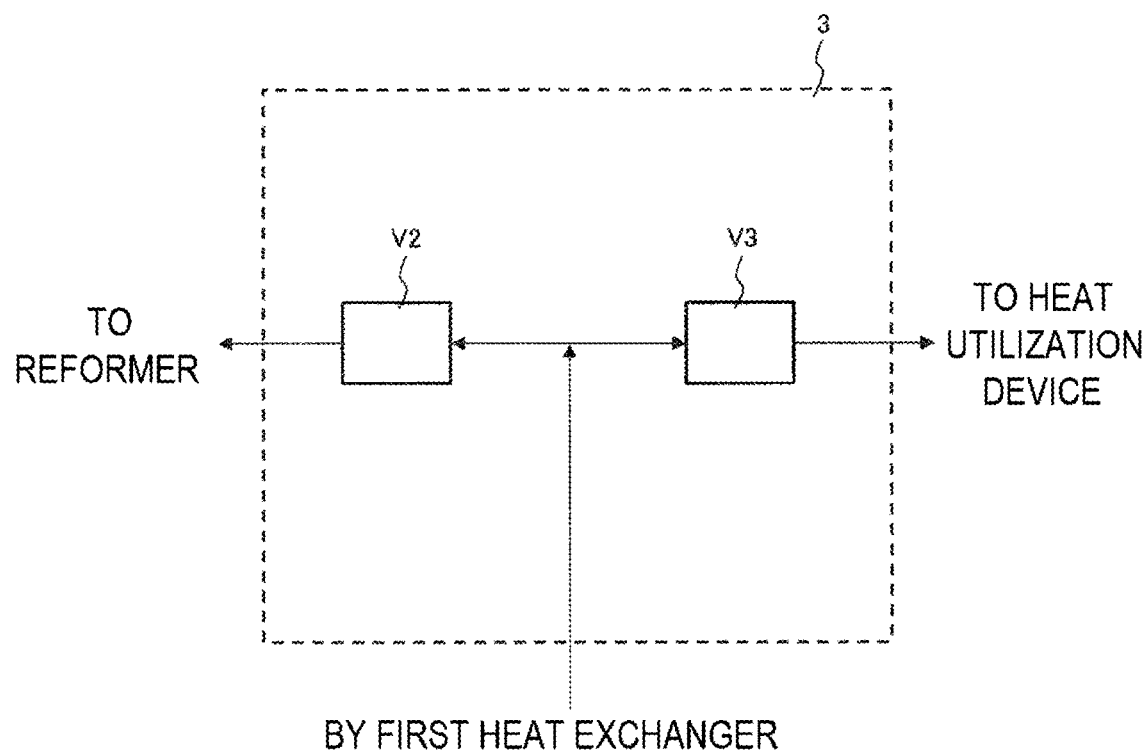
FIG. 2 is a configuration diagram illustrating an example of a distributor 3 in FIG. 1.

FIG. 2 illustrates an example of the distributor 3 in FIG. 1.

In FIG. 2, the distributor 3 is a device that adjusts an amount of the high-temperature steam supplied from the first heat exchanger to be supplied to both or one of the reformer and the heat utilization device. A flow adjusting valve V2 is provided on a reformer side, and a flow adjusting valve V3 is provided on a heat utilization device side.

An amount of high-temperature steam to be supplied to the reformer and the heat utilization device can be controlled by adjusting opening degrees of the flow adjusting valves V2, V3. The amount is controlled based on a required heat-to-electric power ratio. When the heat-to-electric power ratio is to be increased, the amount of the high-temperature steam to be supplied to the heat utilization device is increased. On the other hand, when the heat-to-electric power ratio is to be decreased, the amount of the high-temperature steam to be supplied to the reformer is increased. If either one of the flow adjusting valves V2, V3 is fully closed, a supply destination of the high-temperature steam can be limited to one of the reformer and the heat utilization device. The distributor 3 is controlled by the signals from the control device 51.

When the pressure of the steam at the outlet of the first heat exchanger is 0.3 MPa or more, a pressure reducer is desirably provided between the distributor and the reformer. In the steam reforming of the fuel by the reformer, a reforming reaction is promoted as a pressure in the reformer is lower. Therefore, the pressure reducer is provided, so that the pressure in the reformer can be lowered, and the reaction is promoted. An exhaust heat collect effect due to the endothermic reaction and an efficiency improvement effect of the engine generator due to the hydrogen are improved. The pressure (gauge pressure) in the reformer is preferably maintained at 0.1 MPaG or less by the pressure reducer. As a result, overall efficiency of the system can be increased.

Reformer

Next, the reformer that converts the fuel into the reformed gas will be described.

Figure 3:
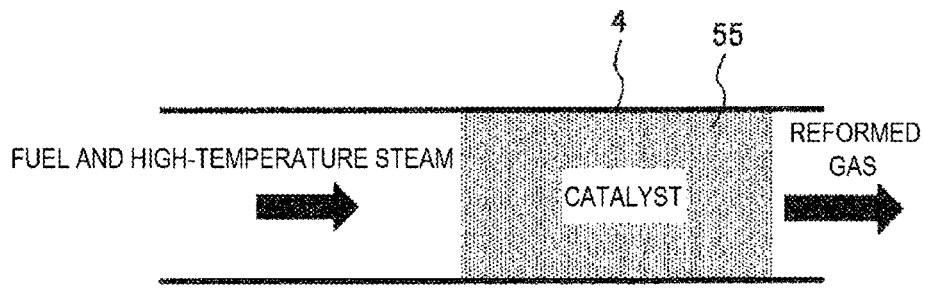
FIG. 3 is a schematic cross-sectional view illustrating an example of a reformer 4 in FIG. 1.

FIG. 3 schematically illustrates an example of the reformer 4 in FIG. 1.

In FIG. 3, the reformer 4 has a catalyst 55 for performing fuel reforming therein. The catalyst 55 is supplied with the fuel and the high-temperature steam, and the reformed gas is sent out as a product. A size and a shape of the catalyst are not limited. The size is appropriately adjusted to correspond to an engine output.

The catalyst 55 provided in the reformer 4 is not limited, and a known item may be used. For example, an item in which a catalyst material is supported on a base material made of metal or ceramic is used. A shape of the base material is not limited, and a pellet type, a honeycomb structure, a sheet, and the like may be used. The catalyst material to be supported includes at least one material selected from, for example, nickel, platinum, palladium, rhodium, iridium, ruthenium, molybdenum, rhenium, tungsten, vanadium, osmium, chromium, cobalt, iron, niobium, copper, zinc, and the like.

As illustrated in FIG. 1, an amount of the fuel to be supplied to the reformer 4 is controlled by the fuel flow control device V1 (fuel supply amount control device). A method for controlling a supply amount will be described later.

The reformed gas generated in the reformer 4 is cooled by the heat medium such as the water in the second heat exchanger 5. The reformed gas after being cooled is supplied from the reformed gas supply device 102 to the power generation device 1. A known device capable of controlling a gas flow, such as a fuel injection valve or a valve, is used as the reformed gas supply device 102. Redundant water collected after cooling the reformed gas may be transported to the water tank or the like again. In addition, a collection tank that saves collected water to be trapped therein may be provided.

Heat Utilization Device

The heat utilization device may be a device necessary for each facility and is not limited. A known heat utilization device is assumed such as one being used as a heat source for a dryer, the room heating device, an absorption-refrigerator, a water heater, and the like.

Control Device

In FIG. 1, the control device 51 controls at least one of the water supply device P1, the distributor 3, the fuel flow control device V1, the fuel supply device 101, and the reformed gas supply device 102. In addition, when a thermometer, a pressure gauge, a flow meter, and the like, which are not illustrated in the figure are provided in a component or a pipe connecting the components, control is performed based on those signals.

Next, an example of a control according to the first embodiment and performed by the control device will be described.

Figure 4:
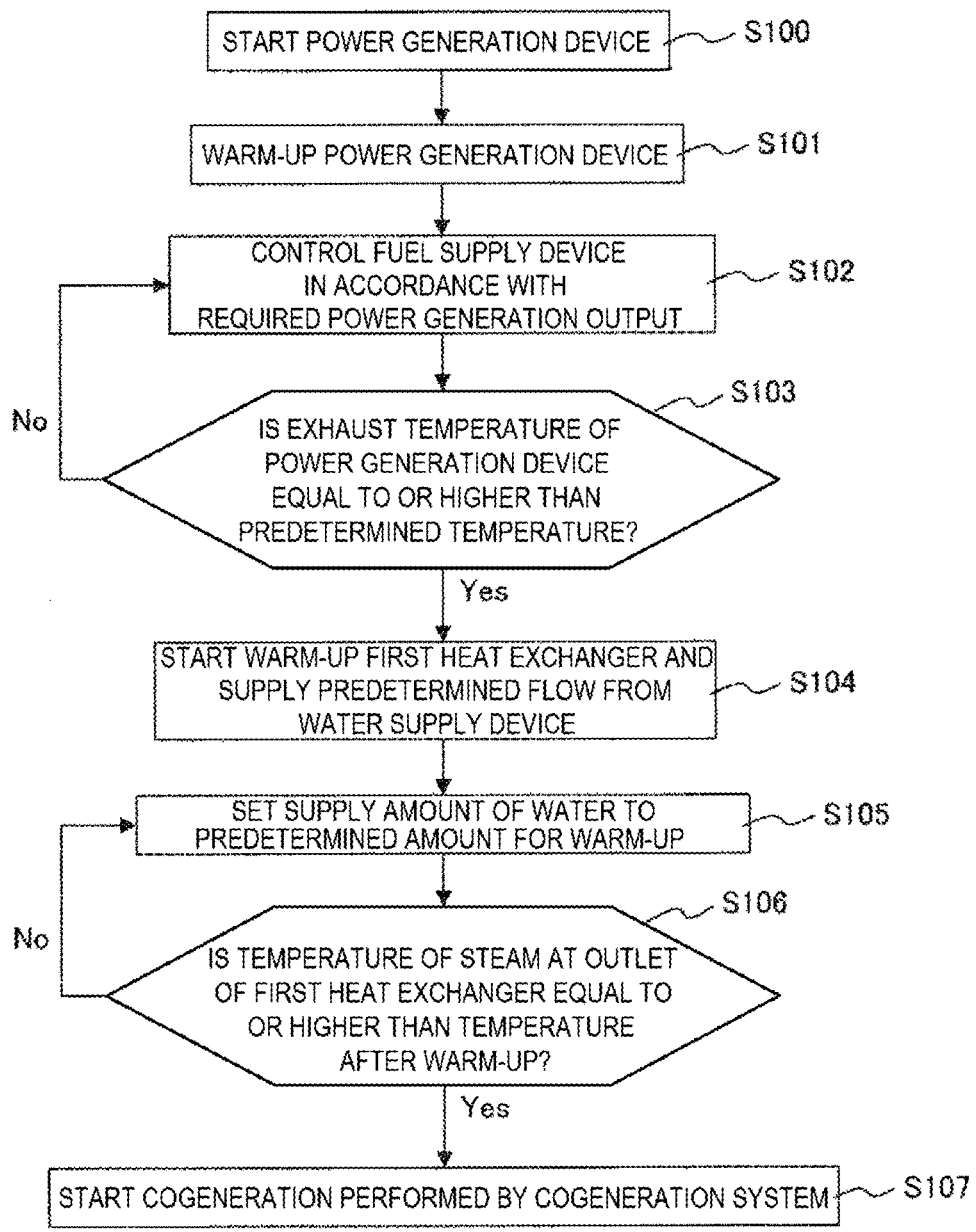
FIG. 4 is a flowchart illustrating an example of a process executed by a control device of the cogeneration system.

FIG. 4 illustrates an example of a control process in a warm-up system.

As shown in this figure, when the power generation device is started (S100), a warm-up operation of the power generation device (S101) is performed simultaneously.

In a case where the engine generator is used, when a temperature of cooling water (not illustrated in FIG. 1) is equal to or higher than a predetermined temperature, it is determined that the warm-up is completed.

A power generation output is confirmed (detected or acquired), and power generation performed by the power generation device is started (S102). In a case where the power generation output of the power generation device is smaller than a required power generation output, a supply amount of the fuel supply device 101 (FIG. 1) is increased.

In a case where the power generation output of the power generation device is larger than the required power generation output, the supply amount of the fuel supply device 101 is decreased. A control of the fuel supply device 101 in S102 is continued until the power generation of the power generation device is stopped.

Next, it is determined whether an exhaust temperature of the power generation device is equal to or higher than a predetermined temperature (S103). Ina case where the exhaust temperature is equal to or higher than the predetermined temperature, the process is preceded to S104. In a case where the exhaust temperature is equal to or lower than the predetermined temperature, the process is returned to S102 and stands by until the exhaust temperature becomes equal to or higher than the predetermined temperature.

In S104, the water supply device P1 is controlled to supply water at the minimum flow. The minimum flow of the water at this time is determined by the specifications of the first heat exchanger.

In S105, a supply amount of water is set to a predetermined amount (warm-up predetermined amount) for warming up the first heat exchanger.

In S106, the temperature of the steam at the outlet of the first heat exchanger is confirmed. In a case where the temperature is lower than the predetermined temperature, the process returns to S105, and the supply amount of water is kept constant until the warm-up of the first heat exchanger is completed. In a case where the temperature is equal to or higher than the predetermined temperature, it is determined that the warm-up of the first heat exchanger is already completed, and cogeneration performed by the cogeneration system is started (S107).

Next, an example of a control method during the cogeneration is illustrated.

Figure 5:
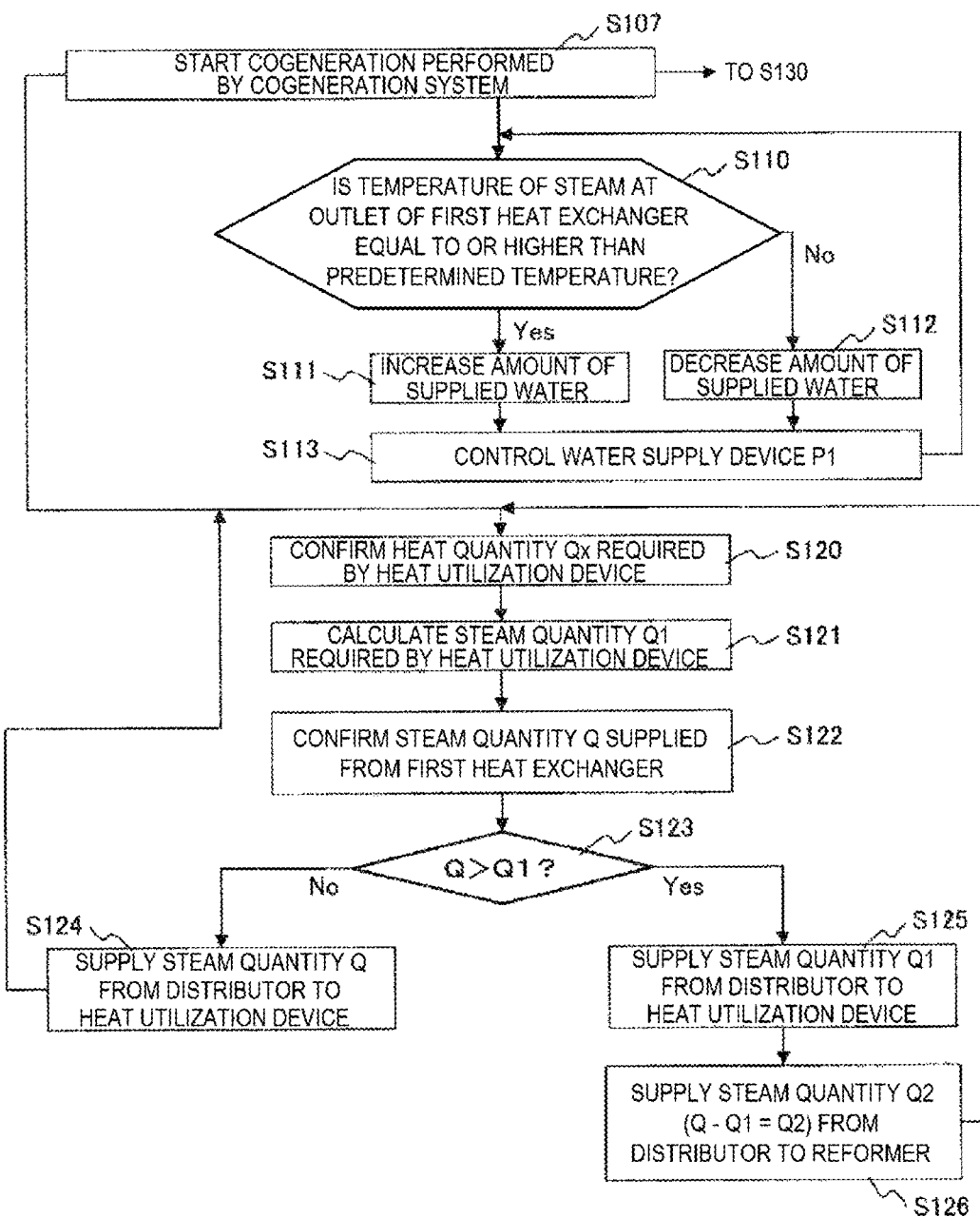
FIG. 5 is a flowchart illustrating an example of a process executed by the control device of the cogeneration system.

FIG. 5 illustrates an operation control process during the cogeneration.

Firstly, in S110, it is determined whether the temperature of the steam at the outlet of the first heat exchanger is equal to or higher than the predetermined temperature. In a case where the temperature is equal to or higher than the predetermined temperature, an instruction is given to increase the amount of supplied water in S111. In a case where the temperature is lower than the predetermined temperature, an instruction is given to decrease the amount of supplied water in S112.

Next, in S113, the water supply device P1 is controlled based on an indicated value. Thereafter, the process returns to S110 and the control is repeated.

By such control, the temperature of the steam at the outlet of the first heat exchanger can be maintained at the predetermined temperature corresponding to changes in the exhaust temperature and an exhaust heat quantity of the power generation device. The predetermined temperature of the first heat exchanger is preferably 400° C. or higher as described above.

S120 to S126 in FIG. 5 relate to a control of the distributor.

Firstly, in S120, a heat quantity Qx required by the heat utilization device is confirmed. Next, in S121, a steam quantity Q1 required by the heat utilization device is calculated by using the Qx. The Q1 is calculated based on the specifications of the heat utilization device and the required heat quantity.

Next, in S122, a steam quantity Q supplied from the first heat exchanger is confirmed.

Next, in S123, a relationship between the Q and the Q1 is confirmed. In a case where the Q is equal to or less than the Q1, the steam quantity Q is supplied from the distributor to the heat utilization device in S124. On the other hand, in a case where the Q is larger than the Q1, the Q1 is supplied from the distributor to the heat utilization device in S125. Further, in S126, an unused steam quantity Q2 (Q−Q1=Q2) is supplied from the distributor to the reformer. Thereafter, the process returns to S120 and the control of the distributor is repeated.

Figure 6:
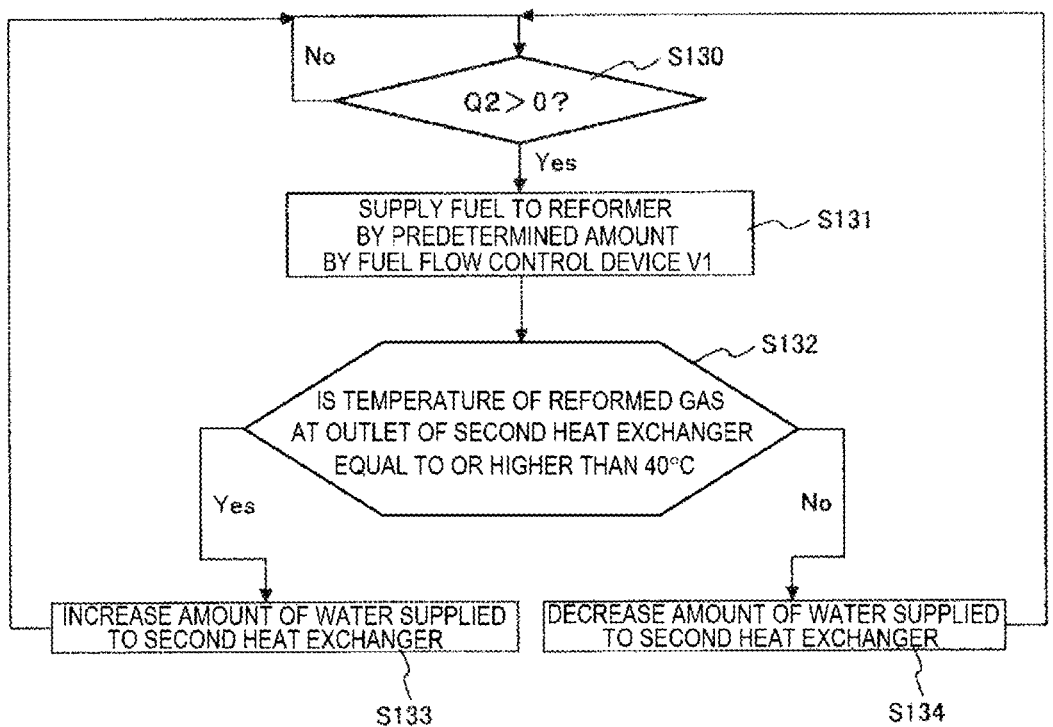
FIG. 6 is a flowchart illustrating an example of a process executed by the control device of the cogeneration system.

FIG. 6 illustrates a control process of the second heat exchanger.

As illustrated in the figure, firstly, it is determined whether the Q2 is a positive value in S130.

When the Q2 is the positive value, in S131, the fuel flow control device V1 controls the fuel supplied to the reformer to a predetermined amount. A supply amount of the fuel is preferably determined based on an amount of the Q2, and is preferably a flow in which an S/C of the gas in the reformer is 5 or more. Here, the S/C refers to a ratio between the number of moles of the steam supplied to the reformer and the number of moles of carbon atoms in the fuel supplied to the reformer. Therefore, when the methane is used as the fuel, it is desirable to adjust an amount of the methane such that the S/C is 5 or more.

Next, in S132, a temperature of the reformed gas at an outlet of the second heat exchanger is confirmed. In a case where the temperature of the reformed gas is equal to or higher than a predetermined temperature, for example, 40° C., an amount of the water supplied to the second heat exchanger is increased (S133). In a case where the temperature of the reformed gas is lower than 40° C., the amount of the water supplied to the second heat exchanger is decreased (S134). Thereafter, the process returns to S130, and controls of amounts of the water supplied to the fuel flow control device V1 and the second heat exchanger are repeated. Here, the temperature of the reformed gas is determined based on 40° C., but this criterion is not limited to 40° C., and is set based on characteristics such as the catalyst of the reformer.

By performing the controls as described above, in the cogeneration system, even when the heat quantity is redundant, redundant steam can be supplied to the reformer and a part of the redundant heat quantity can be reused as the fuel heat quantity. As a result, the heat-to-electric power ratio in the cogeneration system can be decreased, while the power generation efficiency is increased.

In the description of the present embodiment, it is assumed that an engine generator is used as the power generation device. However, in addition to the engine generator, a turbine generator or a fuel cell may also be used.

Second Embodiment

Figure 7:
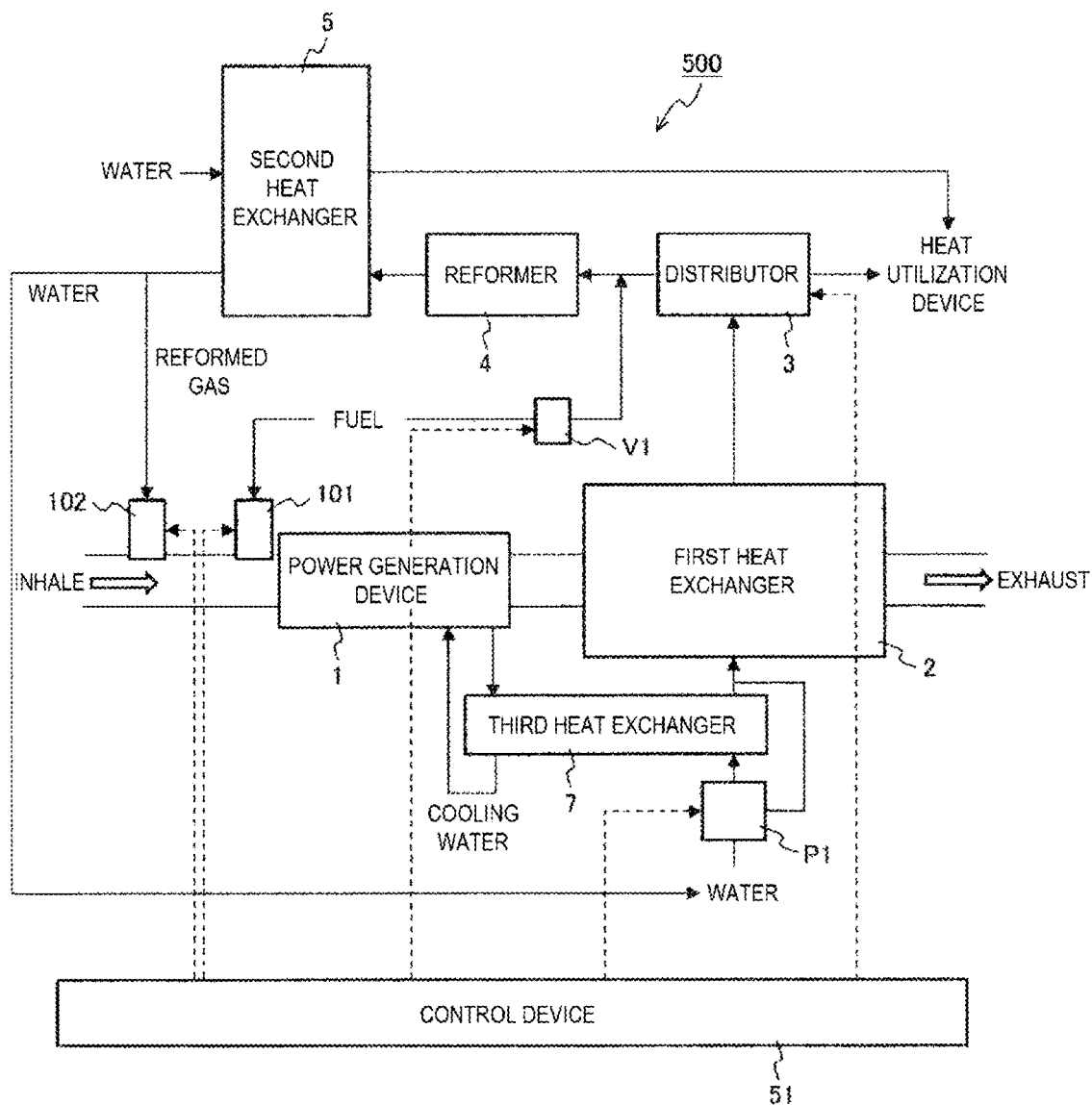
FIG. 7 is a schematic configuration diagram illustrating a cogeneration system according to a second embodiment.

FIG. 7 is a diagram illustrating a schematic configuration of a cogeneration system according to a second embodiment.

In the present embodiment, only configurations different from those of FIG. 1 according to the first embodiment will be described.

In FIG. 7, a third heat exchanger 7 is added. Others are similar to the configuration of FIG. 1.

When the engine generator is used as the power generation device 1, a cooling liquid (engine cooling water) that cools the engine is used and circulates around the engine. In this case, a temperature of the cooling liquid at an outlet of the engine is about 80° C. to 90° C. The cooling liquid is cooled to a predetermined temperature of about 80° C. by air cooling or water cooling.

The third heat exchanger 7 exchanges heat between the water supplied from the water supply device P1 to the first heat exchanger 2 and the engine cooling water.

A heat receiving side of the third heat exchanger 7 is a flow path of the water. The water is supplied from the water supply device P1, heated by the third heat exchanger 7, and then supplied to the first heat exchanger 2. Further, a heat radiation side of the third heat exchanger 7 is a flow path of the engine cooling water. The cooling water supplied from the engine is supplied to the third heat exchanger 7, so as to be cooled, and then is returned to the engine.

According to the above configuration, the temperature of the water can be increased by using a heat quantity discharged from the engine to the engine cooling water, so that a heat quantity collected in the cogeneration system 500 increases. As a result, the amount of the steam supplied to the reformer 4 can be increased, so that the heat-to-electric power ratio can be reduced and the power generation efficiency can be improved.

Since a temperature of the engine cooling water at an outlet of the third heat exchanger 7 must be maintained at a predetermined temperature (80° C.) determined by the specifications of the engine, a flow of the water supplied from the water supply device P1 to the third heat exchanger 7 is increased in a case where the temperature of the engine cooling water of the third heat exchanger 7 is equal to or higher than the predetermined temperature, and is controlled to be decreased in a case where the temperature is lower than the predetermined temperature. However, a total amount of the water supplied to the first heat exchanger 2 is controlled based on the temperature of the steam at the outlet of the first heat exchanger 2 as in the first embodiment. Therefore, a pipe is provided for bypassing surplus water of an amount left after water of a supply amount is supplied to the third heat exchanger 7. This pipe is directly connected to the first heat exchanger 2 from the water supply device P1.

Third Embodiment

Figure 8:
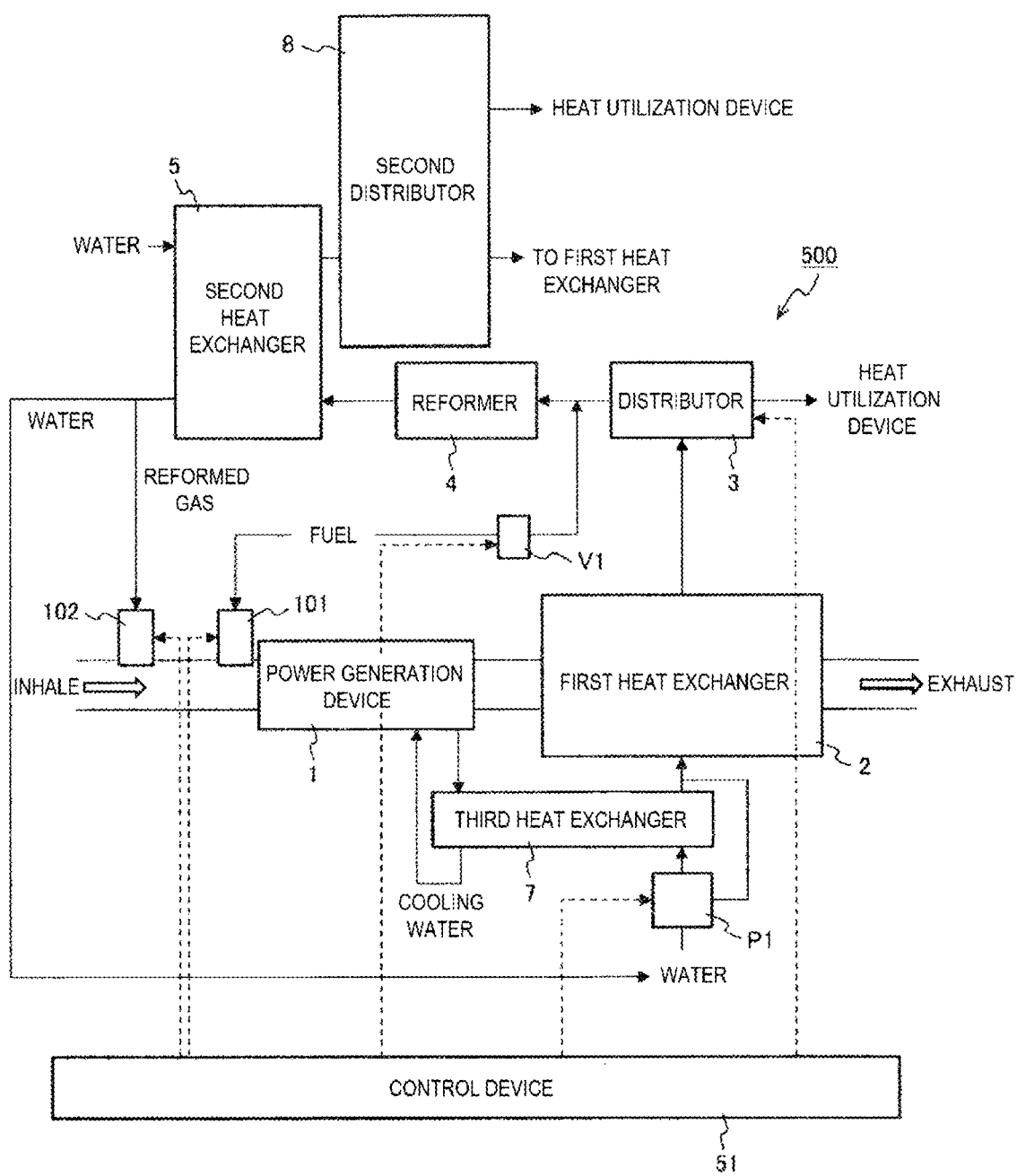
FIG. 8 is a schematic configuration diagram illustrating a cogeneration system according to a third embodiment.

FIG. 8 is a diagram illustrating a schematic configuration a cogeneration system according to a third embodiment.

In the present embodiment, only configurations different from those of FIG. 7 of the second embodiment will be described.

In FIG. 8, a second distributor 8 (another distributor) is added. Others are similar to the configuration of FIG. 7.

The second distributor 8 supplies water heated by the second heat exchanger 5 to at least one of the heat utilization device and the first heat exchanger 2. In the second heat exchanger 5, the water is supplied to a heat receiving flow path side, so that the reformed gas has a predetermined temperature of 40° C. Therefore, the steam temperature or a water temperature at an outlet of the second heat exchanger 5 may not be raised to the temperature required by the heat utilization device depending on a reformed gas flow and specifications of the second heat exchanger 5. Further, when a heat quantity required by the heat utilization device is small, the steam or heated water discharged from the second heat exchanger 5 may be discharged without being used. Therefore, the second distributor 8 is connected to an outlet pipe of a water flow path of the second heat exchanger 5, and performs supply to the heat utilization device or the first heat exchanger 2.

Next, an example of a control method for the second distributor 8 will be described.

In a case where the temperature of the steam or the heated water supplied from the second heat exchanger 5 to the second distributor 8 is equal to or lower than the temperature required by the heat utilization device, the steam or the heated water is totally supplied to the first heat exchanger by the distributor.

In a case where the temperature of the steam or the heated water supplied from the second heat exchanger 5 to the second distributor 8 is equal to or higher than the temperature required by the heat utilization device, the second distributor 8 is controlled based on the heat quantity required by the heat utilization device. In a case where a required heat quantity required from the heat utilization device to the second distributor 8 is larger than a heat quantity of the steam or the heated water supplied from the second heat exchanger 5 to the second distributor 8, the second distributor 8 supplies a total amount of the heat quantity to the heat utilization device. On the other hand, in a case where the required heat quantity required from the heat utilization device to the second distributor 8 is smaller than the heat quantity of the steam or the heated water supplied from the second heat exchanger 5 to the second distributor 8, the required heat quantity is supplied from the second distributor 8 to the heat utilization device, and remaining heat quantity is distributed to the first heat exchanger 2.

By performing such control, the unused heat of the cogeneration system 500 can be reduced, and improvement in overall efficiency can be expected. Further, the heat-to-electric power ratio can be reduced, and an adjustment rate (adjustment capacity) of the heat-to-electric power ratio is larger than that of the first embodiment and the second embodiment.

Although the embodiments of the invention have been described above, the invention is not limited to the embodiments described above, and various modifications can be made without departing from the scope of the invention. For example, the invention is not necessarily limited to those having all the configurations provided in the above embodiments. A part of the configuration of an embodiment can be replaced with the configuration of another embodiment, a part of the configuration of an embodiment can be added to another embodiment, or a part of the configuration of an embodiment can be omitted.

For example, the heat utilization device connected to the cogeneration system 500 of FIGS. 1, 7, and 8 may be one or plural.

Further, the fuel supply device 101 may not be provided, and a total amount of the fuel is supplied to the reformer 4. Therefore, when the steam is supplied from the distributor 3, a part of the fuel supplied to the reformer 4 is reformed, and remaining fuel is supplied to the power generation device 1 without being reformed.

Further, the reformed gas may be temporarily stored in a buffer tank, instead of being supplied without being stored in the power generation device 1. In addition, since the hydrogen contained in the reformed gas can be used as fuel for fuel cell vehicles and the like, a part of the reformed gas may be collected by using a known hydrogen separation technique such as a hydrogen separation membrane, and may be supplied to an outside of the cogeneration system 500 as hydrogen fuel.

Figure 9:
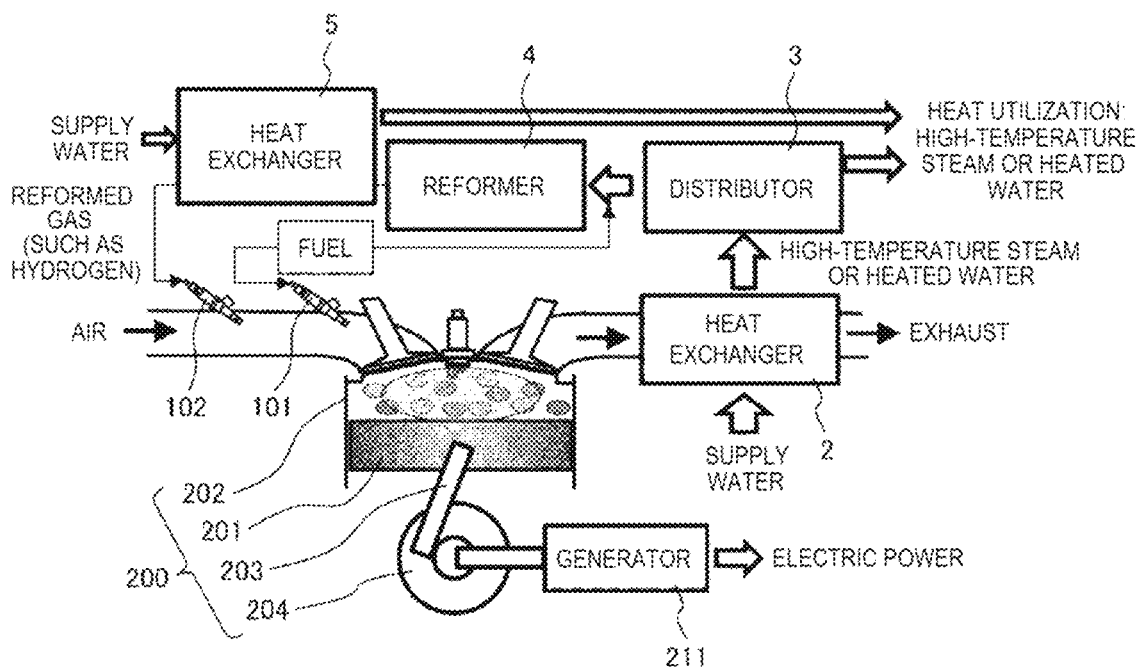
FIG. 9 is a schematic configuration diagram illustrating a case where an engine generator is used as an example of a power generation device that is a component of the invention.

FIG. 9 is a schematic configuration diagram illustrating a case where an engine generator is used as an example of the power generation device that is a component of the invention.

In this figure, the engine generator is configured with an engine 200 (reciprocating engine) and a generator 211. The engine 200 includes a piston 201, a cylinder 202, a connecting rod 203 and a crank 204.

Other configurations illustrated in this figure are the same as those in FIG. 1.

Electric power is generated in the generator 211 by using a power generated in the engine 200.

What is claimed is:

1. A cogeneration system comprising:
   a power generation device configured to supply electric power;
   a first heat exchanger configured to exchange heat between exhaust of the power generation device and water, so as to lower a temperature of the exhaust and obtain steam from the water;
   a reformer configured to generate a reformed gas by the steam reacting with a fuel;
   a second heat exchanger configured to cool the reformed gas generated by the reformer by heat exchanging;
   a reformed gas supply device configured to supply the reformed gas cooled by the second heat exchanger to the power generation device;
   a distributor configured to supply the steam to at least one of the reformer and a heat utilization device; and
   a control device configure to adjust a heat-to-electric power ratio in an increasing direction and in a decreasing direction based on a heat quantity required by changing a supply destination of the steam in the distributor.

2. The cogeneration system according to claim 1, wherein the control device is configured to change a supply amount of the steam in the distributor.

3. The cogeneration system according to claim 1, wherein the control device is configured to control the distributor based on the heat quantity, which is required by the heat utilization device.

4. The cogeneration system according to claim 1, further comprising:
   a water supply device configured to supply the water to the first heat exchanger, wherein
   the control device is configured to control the water supply device based on a temperature of the steam at an outlet of the first heat exchanger.

5. The cogeneration system according to claim 4, further comprising:
   a third heat exchanger configured to exchange heat between at least a part of the water supplied to the first heat exchanger and a cooling liquid that cools the power generation device, so as to raise a temperature of the water and to lower a temperature of the cooling liquid.

6. The cogeneration system according to claim 1, further comprising:
   a fuel flow control valve configured to adjust an amount of the fuel supplied to the reformer, wherein
   the fuel flow control valve is controlled based on an amount of the steam supplied from the distributor to the reformer.

7. The cogeneration system according to claim 6, wherein the power generation device is an engine generator using a reciprocating engine,
   the fuel is methane, and
   the fuel flow control valve is controlled, such that a ratio of the number of moles of the steam supplied to the reformer to the number of moles of carbon atoms contained in the fuel supplied to the reformer is 5 or more.

8. The cogeneration system according to claim 1, wherein the power generation device is an engine generator or a turbine generator.

9. The cogeneration system according to claim 1, wherein
the power generation device is an engine generator using
a reciprocating engine, and
the fuel is methane.

10. The cogeneration system according to claim 1, further comprising:
another distributor configured to supply water heated by the second heat exchanger to at least one of the heat utilization device and the first heat exchanger.

* * * * *